(12) United States Patent
Deenathayalan et al.

(10) Patent No.: US 12,404,654 B2
(45) Date of Patent: Sep. 2, 2025

(54) SYSTEM AND METHOD FOR GENERATING WORK PLAN FOR AUTONOMOUS OPERATION OF COMPACTOR

(71) Applicant: Caterpillar Inc., Peoria, IL (US)

(72) Inventors: Manivannan Deenathayalan, Coimbatore (IN); Vinay Verma, Ghaziabad (IN); Amit Nanaware, Pune (IN)

(73) Assignee: Caterpillar Inc., Peoria, IL (US)

( * ) Notice: Subject to any disclaimer, the term of this patent is extended or adjusted under 35 U.S.C. 154(b) by 286 days.

(21) Appl. No.: 18/081,268

(22) Filed: Dec. 14, 2022

(65) Prior Publication Data

US 2023/0183944 A1    Jun. 15, 2023

(30) Foreign Application Priority Data

Dec. 15, 2021 (IN) .............................. 202111058477

(51) Int. Cl.
*E02F 9/20* (2006.01)
*E02D 3/02* (2006.01)
*G05D 1/00* (2024.01)

(52) U.S. Cl.
CPC .............. *E02F 9/2054* (2013.01); *E02D 3/02* (2013.01); *E02F 9/205* (2013.01); *G05D 1/0214* (2013.01); *G05D 1/0297* (2013.01)

(58) Field of Classification Search
CPC ...... E02F 9/205; E02F 9/2045; G05D 1/0214; E01C 19/004
See application file for complete search history.

(56) References Cited

U.S. PATENT DOCUMENTS 6,088,644 A    7/2000  Brandt
6,112,143 A    8/2000  Allen
(Continued)

FOREIGN PATENT DOCUMENTS

CN    107807644        3/2018
EP     3391167 B1      8/2020
(Continued)

OTHER PUBLICATIONS

European Extended Search Report for European Patent Appln. No. 22207933.7, mailed Apr. 4, 2023 (5 pgs).

(Continued)

*Primary Examiner* — Rachid Bendidi
*Assistant Examiner* — Nada Mahyoob Alqaderi

(57) ABSTRACT

A system for generating a work plan for autonomous operation of a compactor in tandem with an earthmoving machine includes a first controller that receives information pertaining to a work area on which the earthmoving machine is required to perform at least one operation. The system also includes a central controller that receives, from the first controller, information pertaining to the work area on which the earthmoving machine is required to perform the at least one operation and analyzes the work area for virtually segmenting the work area into a plurality of virtual work areas. The central controller also receives, from the first controller, data indicative of a movement of the earthmoving machine through each virtual work area from the plurality of virtual work areas and determines an optimal direction of movement for the compactor based on the data indicative of the movement of the earthmoving machine.

20 Claims, 10 Drawing Sheets

(56) References Cited

U.S. PATENT DOCUMENTS

| | | | |
|---|---|---|---|
| 7,731,450 B2 | 6/2010 | Congdon | |
| 9,606,544 B2 * | 3/2017 | Gariepy | G05D 1/0297 |
| 2013/0311153 A1 * | 11/2013 | Moughler | G06Q 10/047 |
| | | | 703/6 |
| 2017/0200306 A1 | 7/2017 | Marsolek | |
| 2019/0055715 A1 | 2/2019 | Wei et al. | |
| 2019/0186094 A1 | 6/2019 | Marsolek et al. | |
| 2020/0103906 A1 * | 4/2020 | O'Donnell | G05D 1/0278 |
| 2020/0356088 A1 * | 11/2020 | Schlacks, IV | G05D 1/6985 |
| 2021/0008997 A1 | 1/2021 | Marsolek | |
| 2021/0149403 A1 * | 5/2021 | Ready-Campbell | |
| | | | G05D 1/0027 |
| 2021/0341944 A1 * | 11/2021 | Schoon | G06F 16/1744 |
| 2023/0081284 A1 * | 3/2023 | Nishii | G05D 1/6484 |
| | | | 701/25 |

FOREIGN PATENT DOCUMENTS

| | | | |
|---|---|---|---|
| GB | 2124798 B | 11/1987 | |
| JP | 6716195 B2 | 7/2020 | |
| JP | 2021188362 A | 12/2021 | |
| WO | 2020006698 A1 | 1/2020 | |
| WO | WO-2021222720 A1 * | 11/2021 | A01B 79/005 |

OTHER PUBLICATIONS

Indian First Examination Report for India Patent Appln. No. 202111058477, mailed Dec. 18, 2023 (6 pgs).

* cited by examiner

SYSTEM AND METHOD FOR GENERATING WORK PLAN FOR AUTONOMOUS OPERATION OF COMPACTOR

CROSS-REFERENCE TO RELATED APPLICATION

This application claims priority under 35 USC § 6119 and the Paris Convention to Indian Patent Application 202111058477 filed on Dec. 15, 2021.

TECHNICAL FIELD

The present disclosure relates to a system and a method for generating a work plan for autonomous operation of a compactor in tandem with an earthmoving machine.

BACKGROUND

Various operations, such as material removal, material movement, and/or material distribution may have to be performed at a worksite before initiating construction of infrastructures such as, for example, roadways, speedways for motor vehicles, airport runways, dams, water spill ways, and residential or commercial facilities.

Typically, worksite preparation may require the use of several types of machines. In some cases, a dozer may be required to perform a grading operation at a particular area of the worksite. Subsequently, the dozed worksite may be followed up with a compaction operation that may require use of a compactor thereon. With advancement of technology, machines are being designed to operate in an autonomous manner as they offer various advantages. For example, autonomous machines may be used to replace involvement or need for human workers/operators especially in unsuitable environments, such as, at high altitudes, or at sparsely populated regions. Further, autonomous machines may operate for longer periods of time as compared to manned machines, thereby increasing productivity. Furthermore, autonomous machines may be operated in accordance with precise control strategies aimed at fulfilling one or more end objectives, for instance, optimizing efficiency while reducing downtime and emissions.

U.S. Pat. No. 6,112,143 discloses an apparatus and method for establishing the perimeter of a work site for a mobile machine capable of operating autonomously or semi-autonomously. The apparatus and method includes activating a learning mode, positioning the mobile machine at a plurality of locations on the perimeter, and recording position data at each location from a sensor system, such as GPS, that provide signals corresponding to the position of the mobile machine. The position data is stored and a data processor associated with a control system generates a display of the perimeter so that an operator may visually verify the size, location, and shape of the work area bounded by the perimeter.

SUMMARY

In one aspect of the present disclosure, a system for generating a work plan for autonomous operation of a compactor in tandem with an earthmoving machine is provided. The system includes a first controller associated with the earthmoving machine. The first controller receives information pertaining to a work area on which the earthmoving machine is required to perform at least one operation. The system also includes a central controller coupled in communication with the first controller. The central controller is configured to receive, from the first controller, information pertaining to the work area on which the earthmoving machine is required to perform the at least one operation. The central controller is also configured to analyze the work area for virtually segmenting the work area into a plurality of virtual work areas based on a receipt of the information pertaining to the work area. The central controller is further configured to receive, from the first controller, data indicative of a movement of the earthmoving machine through each virtual work area from the plurality of virtual work areas. The central controller is configured to determine an optimal direction of movement for the compactor on at least one virtual work area from the plurality of virtual work areas based on the data indicative of the movement of the earthmoving machine, such that the compactor is configured to move along the optimal direction of movement during the autonomous operation of the compactor. The central controller is also configured to generate a virtual fence around the at least one virtual work area from the plurality of virtual work areas based on generation of the optimal direction of movement for the compactor. The central controller is further configured to transmit information pertaining to the optimal direction of movement to the compactor on the at least one virtual work area from the plurality of virtual work areas when the earthmoving machine is outside the virtual fence.

In another aspect of the present disclosure, a method for generating a work plan for autonomous operation of a compactor in tandem with an earthmoving machine is provided. The method includes receiving, by a first controller associated with the earthmoving machine, information pertaining to a work area on which the earthmoving machine is required to perform at least one operation. The method also includes receiving, by a central controller, information pertaining to the work area on which the earthmoving machine is required to perform the at least one operation from the first controller. The central controller is coupled in communication with the first controller. The method further includes analyzing, by the central controller, the work area for virtually segmenting the work area into a plurality of virtual work areas based on a receipt of the information pertaining to the work area. The method includes receiving, by the central controller, data indicative of a movement of the earthmoving machine through each of the plurality of virtual work areas from the first controller. The method also includes determining, by the central controller, an optimal direction of movement for the compactor on at least one virtual work area from the plurality of virtual work areas based on the data indicative of the movement of the earthmoving machine, such that the compactor is configured to move along the optimal direction of movement during the autonomous operation of the compactor. The method also includes generating, by the central controller, a virtual fence around the at least one virtual work area from the plurality of virtual work areas based on generation of the optimal direction of movement for the compactor. The method further includes transmitting, by the central controller, information pertaining to the optimal direction of movement to the compactor on the at least one virtual work area from the plurality of virtual work areas when the earthmoving machine is outside the virtual fence.

In yet another aspect of the present disclosure, a computer readable medium having computer executable instructions for performing a method for generating a work plan for autonomous operation of a compactor in tandem with an earthmoving machine. The method includes receiving information pertaining to a work area on which the earthmoving machine is required to perform at least one operation. The method also includes analyzing the work area for virtually segmenting the work area into a plurality of virtual work areas based on a receipt of the information pertaining to the work area. The method further includes receiving data indicative of a movement of the earthmoving machine through each of the plurality of virtual work areas. The method includes determining an optimal direction of movement for the compactor on at least one virtual work area from the plurality of virtual work areas based on the data indicative of the movement of the earthmoving machine, such that the compactor is configured to move along the optimal direction of movement during the autonomous operation of the compactor. The method also includes generating a virtual fence around the at least one virtual work area from the plurality of virtual work areas based on generation of the optimal direction of movement for the compactor. The method further includes transmitting information pertaining to the optimal direction of movement to the compactor on the at least one virtual work area from the plurality of virtual work areas when the earthmoving machine is outside the virtual fence.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1:
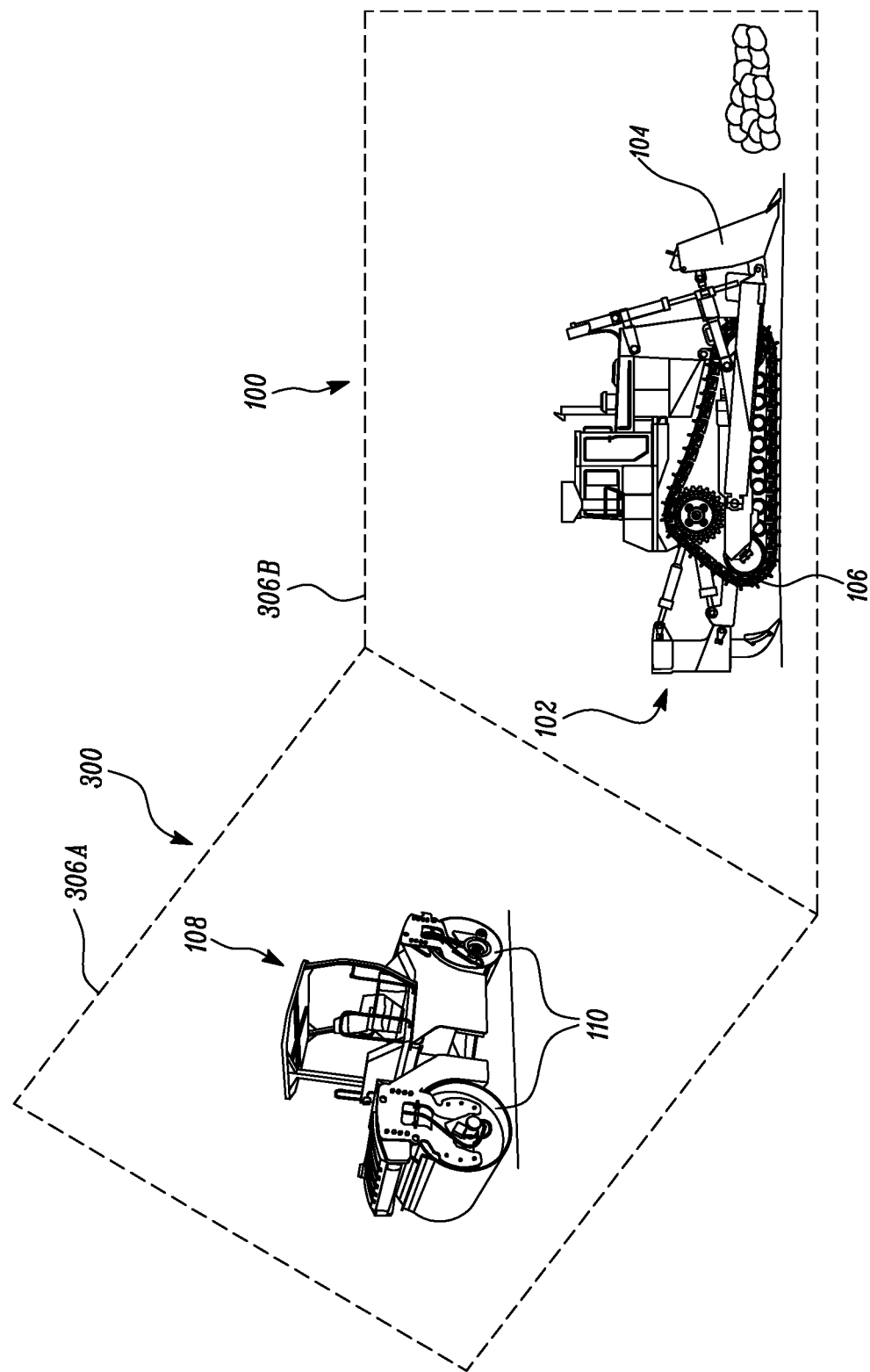
FIG. 1 is a pictorial view depicting an earthmoving machine and a compactor operating at a worksite, according to an exemplary embodiment of the present disclosure.

Referring to FIG. 1, a portion of an exemplary worksite 100 is illustrated. The worksite 100 may include, for example, a mine site, a land fill, a quarry, and a construction site. The worksite 100 may be any worksite, such as, for construction of roadways or access roads, residential complexes, or commercial complexes, or any other type of worksite on which work or labor may be performed.

In one example, the worksite 100 may undergo geographic alterations due to work being performed thereon by one or more earthmoving machines. For example, an earthmoving machine 102 embodied as a dozer may operate at the worksite 100. The earthmoving machine 102 includes an implement 104 and a pair of ground engaging members 106 (only one of which is illustrated herein) embodied as tracks. The earthmoving machine 102 may perform one or more tasks such as a grading operation or any other geography-altering tasks at the worksite 100. Alternatively, the earthmoving machine 102 may be embodied as an excavator, a tractor, a loader, a grader, a scraper, or any other machine that may perform earthmoving operations.

Further, a compactor 108 may also operate at the worksite 100 and in tandem with the earthmoving machine 102. For example, the compactor 108 may perform a compaction operation at the worksite 100 previously worked upon by the earthmoving machine 102. The compactor 108 may be embodied as a soil compactor. In another example, the compactor 108 may be embodied as a pneumatic compactor. The compactor 108 includes a pair of drums 110. Alternatively, the compactor 108 may include a single drum and a pair of wheels. The compactor 108 disclosed herein is embodied as an autonomous compactor or a semi-autonomous compactor.

For exemplary purposes, one earthmoving machine 102 and one compactor 108 are illustrated in FIG. 1. However, more than one earthmoving machine 102 and more than one compactor 108 may operate at the worksite 100 depending on specific requirements of an application. Further, the earthmoving machine 102 and the compactor 108 may operate on one or more exemplary work areas 300, 400, and 406 (shown in FIGS. 3, 4A, and 4B, respectively) defined at the worksite 100.

Figure 2:
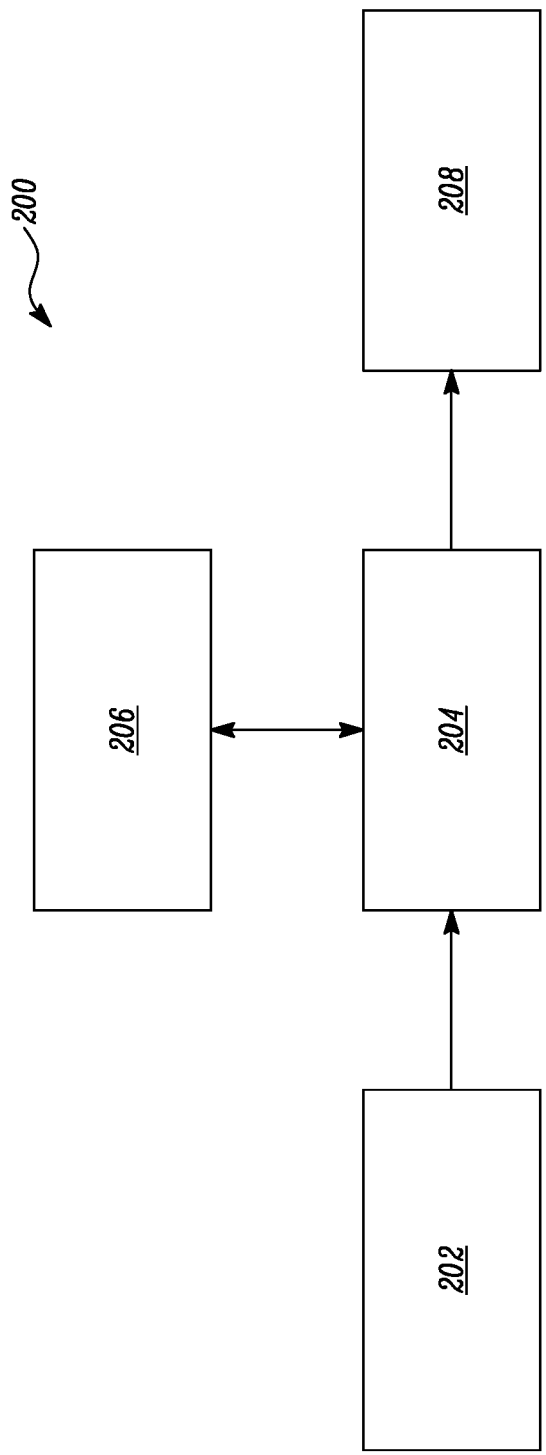
FIG. 2 is a block diagram depicting a system for generating a work plan for autonomous operation of the compactor in tandem with the earthmoving machine, according to an exemplary embodiment of the present disclosure.

Referring to FIG. 2, a system 200 for generating a work plan for autonomous operation of the compactor 108 (see FIG. 1) in tandem with the earthmoving machine 102 (see FIG. 1) is illustrated. The work plan may include details, such as, an optimal direction of movement for the compactor 108, an entry point 302, 304 (shown in FIG. 3) from which the compactor 108 may enter the work area 300, 400, and 406 (see FIGS. 3, 4A, and 4B, respectively) to be worked on, an exit point 302, 304 from which the compactor 108 may exit the work area 300, 400, and 406 to be worked on, and portions of the work areas 300, 400, and 406 on which the compactor 108 is required to perform the compaction operation. For explanatory purposes, the system 200 will now be explained in relation to operations being performed on the work area 300 by the earthmoving machine 102. However, the description provided below is equally applicable to the other work areas 400, 406.

As shown in FIG. 2, the system 200 includes a first controller 202 associated with the earthmoving machine 102 (see FIG. 1). The first controller 202 may be present onboard the earthmoving machine 102. The first controller 202 receives information pertaining to the work area 300 on which the earthmoving machine 102 is required to perform one or more operations. The information pertaining to the work area 300 may be uploaded to the first controller 202 by an operator or a personnel in charge of the worksite 100 (see FIG. 1) or the earthmoving machine 102. In an example, the information pertaining to the work area 300 may be pre-stored within a memory (not shown) associated with the first controller 202. The one or more operations may include, for example, a grading operation, a material excavation operation, backfill or reclamation, and a material movement operation.

In an example, the information pertaining to the work area 300 may include a virtual design boundary of the work area 300 on which the earthmoving machine 102 is required to perform the one or more operations. The virtual design boundary may include information such as a layout of the work area 300 and a surface area defined by the work area 300. It should be noted that the virtual design boundary of the work area 300 may be of any arbitrary shape and size.

In an example, in addition to the virtual design boundary of the work area 300, the first controller 202 may also receive details such as a location of the work area 300 or other parameters such as the presence of buildings, trees, or other objects/obstacles present on the work area 300. Further, the virtual design boundary of the work area 300 may be displayed on a display device (not shown) present within the earthmoving machine 102. Based on the receipt of the information pertaining to the work area 300, an operator of the earthmoving machine 102 may initiate operation of the earthmoving machine 102 for executing the one or more operations to be performed on the work area 300. In an example, when the earthmoving machine 102 initiates the one or more operations on the work area 300, the first controller 202 may transmit an elevation data of the work area 300 to a central controller 204.

Further, the system 200 also includes the central controller 204 coupled in communication with the first controller 202. The central controller 204 may execute instructions stored on a computer readable medium to perform methods for generating the work plan for the autonomous operation of the compactor 108 in tandem with the earthmoving machine 102. The central controller 204 may be located at a back office or a remote operator station. The central controller 204 may be in communication with a memory 206 via wired means or wireless means. The wireless means may include, for example, Wi-Fi, Bluetooth, or any other such means. The memory 206 may include, for example, a flash memory, a random-access memory (RAM), and an electrically erasable programmable read-only memory (EEPROM). The memory 206 may store data, such as, algorithms, instructions, and arithmetic operations. The central controller 204 may execute various types of digitally stored instructions such as a software or an algorithm, retrieved from the memory 206, or a firmware program which may enable the central controller 204 to perform a wide variety of operations. Although aspects of the present disclosure may be described generally as being stored in the memory 206, it may be contemplated that these aspects can be stored on or read from different types of computer program products or computer-readable media, such as, computer chips and secondary storage devices including hard disks, floppy disks, optical media, compact disc-read only memory (CD-ROM), or other forms of RAM or read only memory (ROM). In some examples, the work plan generated by the central controller 204 may be stored in the memory 206.

The central controller 204 receives the information pertaining to the work area 300 on which the earthmoving machine 102 is required to perform the one or more operations from the first controller 202. For example, the central controller 204 may receive the elevation data and/or the virtual design boundary of the work area 300 from the first controller 202. Moreover, the central controller 204 may receive data corresponding to the one or more operations being performed by the earthmoving machine 102. The information may be transmitted via wireless means, such as, Wi-Fi, Bluetooth, or any other such means. In an example, the data received from the first controller 202 may be stored in the memory 206 of the central controller 204 for further processing.

Figure 3:
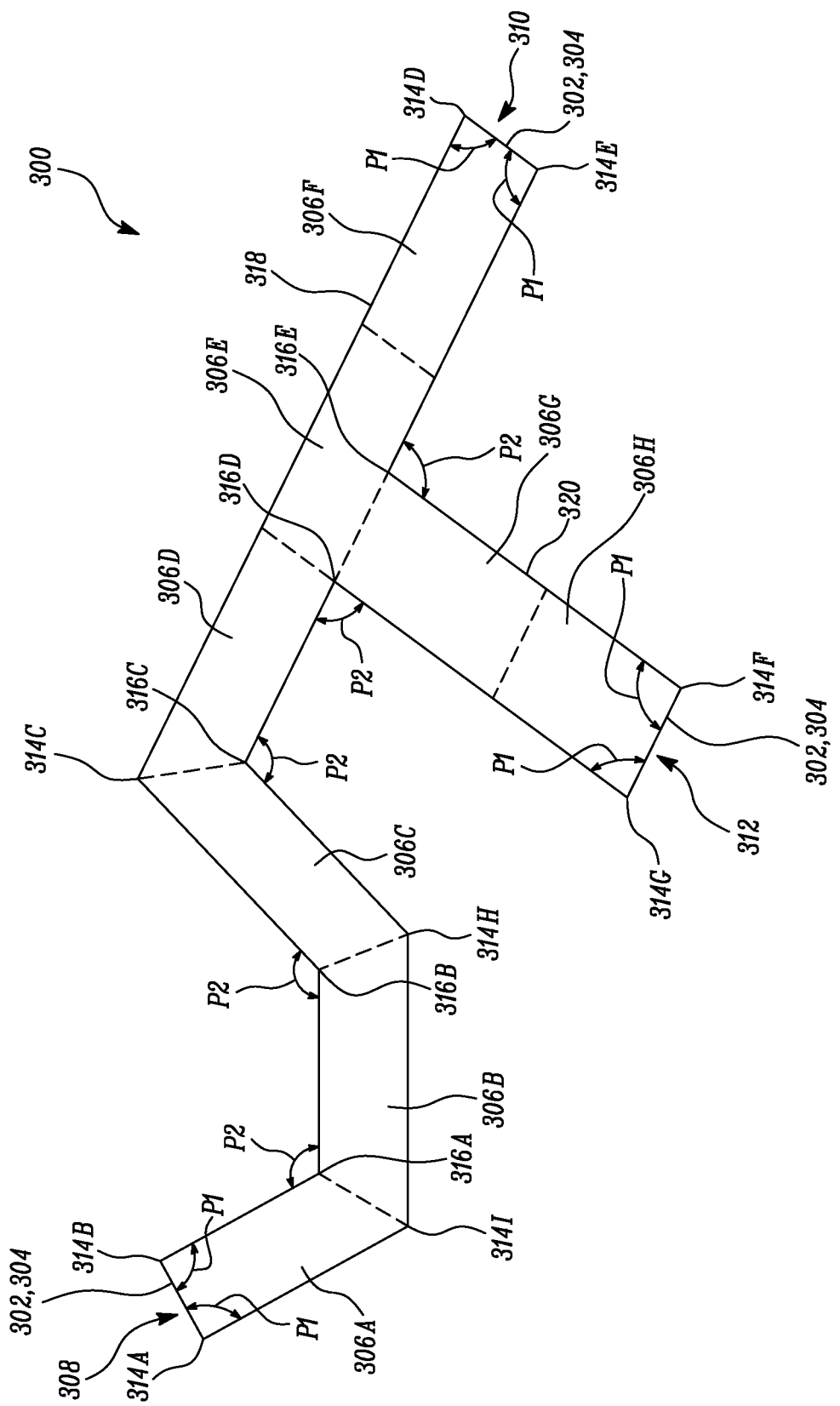
FIG. 3 is a schematic view of an exemplary work area on which the earthmoving machine may operate.

As shown in FIG. 3, the central controller 204 (see FIG. 2) analyzes the work area 300 for virtually segmenting the work area 300 into a number of virtual work areas 306A, 306B, 306C, 306D, 306E, 306F, 306G, 306H based on a receipt of the information pertaining to the work area 300. More particularly, the central controller 204 may analyze one or more convex vertices 314A, 314B, 314C, 314D, 314E, 314F, 314G, 314H, 314I and one or more concave vertices 316A, 316B, 316C, 316D, 316E of the work area 300 for virtually segmenting the work area 300 into the number of virtual work areas 306A, 306B, 306C, 306D, 306E, 306F, 306G, 306H. The terms "convex vertex" as used herein relates to a vertex on the virtual design boundary having an angle that is less than 180 degrees. The terms "concave vertex" as used herein relates to a vertex on the virtual design boundary having an angle that is greater than 180 degrees.

The work area 300 may be virtually segmented based on factors, such as, a length of each virtual work area 306A, 306B, 306C, 306D, 306E, 306F, 306G, 306H and/or the surface area of the work area 300, without any limitation thereto. In an example, a length of each virtual work area 306A, 306B, 306C, 306D, 306E, 306F, 306G, 306H may lie between 20 foot and 70 foot on ground, without any limitation thereto. In an example, a width of each virtual work area 306A, 306B, 306C, 306D, 306E, 306F, 306G, 306H may lie between 5 foot and 30 foot on ground, without any limitation thereto. It should be noted that although the work area 300 is virtually segmented along a length of the work area 300, it may be contemplated that the work area 300 may be virtually segmented along a width of the work area 300.

The central controller 204 may determine one or more entry points 302 for the compactor 108 and exit points 304 for the compactor 108 based on an analysis of the number of convex vertices 314A, 314B, 314C, 314D, 314E, 314F, 314G, 314H, 314I. As illustrated, the work area 300 includes nine convex vertices 314A, 314B, 314C, 314D, 314E, 314F, 314G, 314H, 314I. It should be noted that the entry point 302 and the exit point 304 may be determined based on an analysis of a direction of movement of the earthmoving machine 102 (see FIG. 1) on the work area 300. Accordingly, in an example, the entry point 302 may be defined at any of a first end 308, a second end 310, or a third end 312 based on the direction of movement that the earthmoving machine 102 may have previously followed, without any limitation thereto. Moreover, in an example, the exit point 304 may be defined at any of the first end 308, the second end 310, or the third end 312 based on the direction of movement that the earthmoving machine 102 may have previously followed, without any limitation thereto.

For determining the entry point 302 and the exit point 304, the central controller 204 may determine all the convex vertices 314A, 314B, 314C, 314D, 314E, 314F, 314G, 314H, 314I present on the virtual design boundary corresponding to the work area 300. If an effective angle change on edges with the convex vertices 314A, 314B, 314C, 314D, 314E, 314F, 314G, 314H, 314I is equal to 180 degrees, the central controller 204 may assign two of those convex vertices 314A, 314B, 314C, 314D, 314E, 314F, 314G, 314H, 314I as the entry point 302 and two of those convex vertices 314A, 314B, 314C, 314D, 314E, 314F, 314G, 314H, 314I as the exit point 304. In an example, the central controller 204 may determine an angle P1 defined by each convex vertex 314A, 314B, 314C, 314D, 314E, 314F, 314G, 314H, 314I. Further, the central controller 204 may determine from the virtual design boundary if any two convex vertices 314A, 314B, 314C, 314D, 314E, 314F, 314G, 314H, 314I are located in succession to each other along a periphery of the virtual design boundary. Moreover, if a summation of the angles P1 defined by any two successively disposed convex vertices 314A, 314B, 314C, 314D, 314E, 314F, 314G, 314H, 314I is equal to 180 degrees, the central controller 204 may assign the entry point 302 and/or the exit point 304.

FIG. 3 illustrates two adjacent convex vertices 314A, 314B defined proximate to the first end 308, two adjacent convex vertices 314D, 314E defined proximate to the second end 310, and two adjacent convex vertices 314F, 314G defined proximate to the third end 312. Further, the summation of the angles P1 defined by the two convex vertices 314A, 314B is substantially equal to 180 degrees. Accordingly, the central controller 204 may assign the entry point 302 and/or the exit point 304 proximate to the first end 308.

Further, the summation of the angles P1 defined by the two convex vertices 314D, 314E is substantially equal to 180 degrees, the central controller 204 may assign the entry point 302 and/or the exit point 304 proximate to the second end 310. Similarly, the summation of the angles P1 defined by the two convex vertices 314F, 314G is substantially equal to 180 degrees, the central controller 204 may assign the entry point 302 and/or the exit point 304 proximate to the third end 312. In an example, the central controller 204 may also generate entry and exit points for each virtual work area 306A, 306B, 306C, 306D, 306E, 306F, 306G, 306H.

Further, the central controller 204 may split the work area 300 into the number of virtual work areas 306A, 306B, 306C, 306D, 306E, 306F, 306G, 306H based on an angle P2 defined by the number of concave vertices 316A, 316B, 316C, 316D, 316E. The number of virtual work areas 306A, 306B, 306C, 306D, 306E, 306F, 306G, 306H may include one or more of a structured virtual work area and an unstructured virtual work area. The term "structured virtual work area" as used herein relates to the virtual work areas 306A, 306B, 306C, 306D, 306E, 306F, 306G, 306H that may have a definite shape, such as, a rectangular shape, a square shape, a triangular shape, and a trapezoidal shape, or any other such regular polygonal shape. Further, the term "unstructured virtual work area" as described herein relates to virtual work areas generated on the work area 300 that may have an arbitrary and/or non-definite shapes. It should be noted that the present disclosure is not limited by scope in the determination of a structured/unstructured work area vis-à-vis a shape of the virtual work areas 306A, 306B, 306C, 306D, 306E, 306F, 306G, 306H.

The central controller 204 may determine whether a particular virtual work area 306A, 306B, 306C, 306D, 306E, 306F, 306G, 306H is a structured work area or an unstructured work area based on the angle P2 defined at the number of concave vertices 316A, 316B, 316C, 316D, 316E. Further, the work area 300 includes five concave vertices 316A, 316B, 316C, 316D, 316E. In an example, the concave vertices 316A, 316B, 316C, 316D, 316E may be indicative of a bend or a turn on the work area 300 that the earthmoving machine 102 or the compactor 108 may operate on.

In an example, when the angle P2 at each of the concave vertices 316A, 316B lies approximately between 60 degrees and 140 degrees, the work area 300 may be virtually segmented into the virtual work areas 306A, 306B. Specifically, each virtual work area 306A, 306B is divided into a structured virtual work area having a substantially trapezoidal shape. Further, the work area 300 may be virtually segmented to form the virtual work area 306A based on a joining of the concave vertex 316A and the convex vertex 314I. Moreover, the work area 300 may be virtually segmented to form the virtual work area 306B based on a joining of the concave vertex 316B and the convex vertex 314H. Further, as the angle P2 at the concave vertex 316C lies approximately between 60 degrees and 140 degrees, the work area 300 may be virtually segmented into the virtual work area 306C. Specifically, the virtual work area 306C is divided into a structured virtual work area that is substantially parallelogram shaped. Further, the work area 300 may be virtually segmented to form the virtual work area 306C based on a joining of the concave vertex 316C and the convex vertex 314C. Further, a portion of the work area 300 defined along an edge 318 of the work area 300 may be divided into the three virtual work areas 306D, 306E, 306F based on a size of the work area 300 defined along the edge 318. Each virtual work area 306D, 306E, 306F includes a rectangular shape.

Furthermore, the angle P2 at the concave vertices 316D, 316E is approximately equal to 90 degrees. In such an example, the work area 300 may be virtually segmented into the virtual work areas 306G, 306H. Further, each of the virtual work areas 306G, 306H illustrated herein are structured virtual work areas having a substantially rectangular shape. Furthermore, the work area 300 may be virtually segmented to form the virtual work area 306G, 306H based on a joining of the concave vertex 316D and the concave vertex 316E. It should be further noted that a portion of the work area 300 defined along an edge 320 of the work area 300 may be divided into the two virtual work areas 306G, 306H based on a size of the work area 300 defined along the edge 320.

Figure 4B:
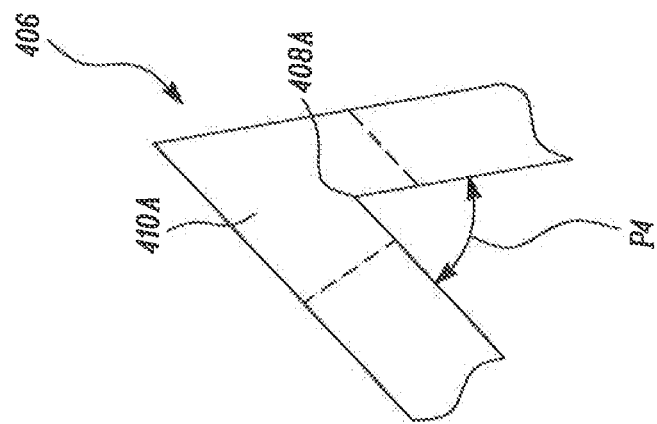
FIG. 4B is a schematic view illustrating an exemplary unstructured virtual work area associated with yet another exemplary work area.
Figure 4A:
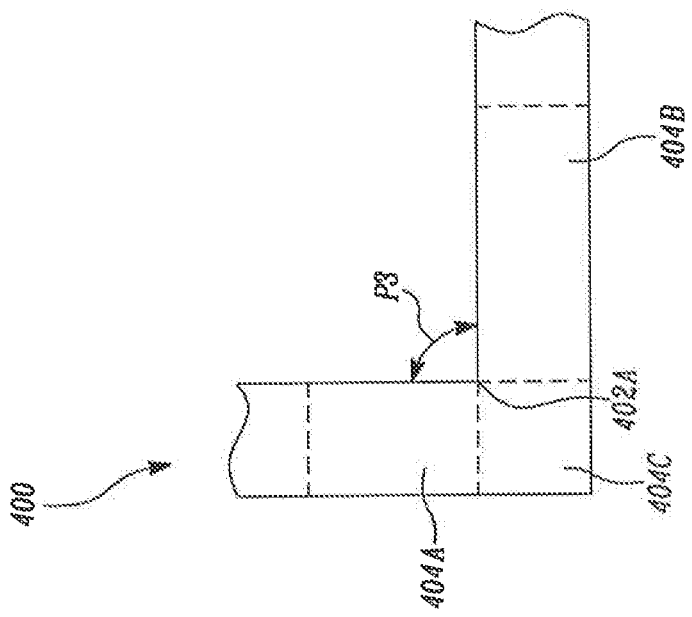
FIG. 4A is a schematic view illustrating various structured virtual work areas associated with another exemplary work area.

FIG. 4A illustrates another exemplary technique for virtually segmenting the exemplary work area 400. As shown in FIG. 4A, the work area 400 defines a concave vertex 402A. An angle P3 defined by the concave vertex 402A is approximately equal to 90 degrees. Further, the work area 400 may be virtually segmented into the virtual work areas 404A, 404B, 404C. Furthermore, each virtual work area 404A, 404B illustrated herein is a structured virtual work area having a substantially rectangular shape. Moreover, the work area 400 may also be virtually segmented into the virtual work area 404C. The virtual work areas 404C illustrated herein is a structured virtual work area having a substantially square shape.

Referring now to FIG. 4B, another exemplary technique for virtually segmenting the exemplary work area 406 is illustrated. As shown in FIG. 4B, the work area 406 defines a concave vertex 408A, such that an angle P4 defined by the concave vertex 408A is less than 60 degrees. As the concave vertex 408A is less than 60 degrees, the work area 406 may be virtually segmented into a virtual work area 410A. It should be noted that the virtual work area 410A includes an unstructured work area. The unstructured work area may have any arbitrary or non-definite shape.

Referring again to FIGS. 1 and 2, the central controller 204 may also determine if the earthmoving machine 102 has concluded the one or more operations on the one or more virtual work areas 306A, 306B, 306C, 306D, 306E, 306F, 306G, 306H (see FIG. 3). The central controller 204 may determine that the one or more operations have been concluded based on information received from the first controller 202. For example, the operator of the earthmoving machine 102 may provide an input to the first controller 202 that may be indicative of the conclusion of the one or more operations on the one or more virtual work areas 306A, 306B, 306C, 306D, 306E, 306F, 306G, 306H. The first controller 202 may in turn transmit this information to the central controller 204 via wireless means, such as, Wi-Fi, Bluetooth, or any other such means.

Further, in an example, the central controller 204 may transmit the information indicative of the conclusion of the one or more operations at each of the virtual work areas 306A, 306B, 306C, 306D, 306E, 306F, 306G, 306H (see FIG. 3) to a second controller 208 associated with the compactor 108. The second controller 208 may be coupled in communication with the central controller 204.

Figure 5:
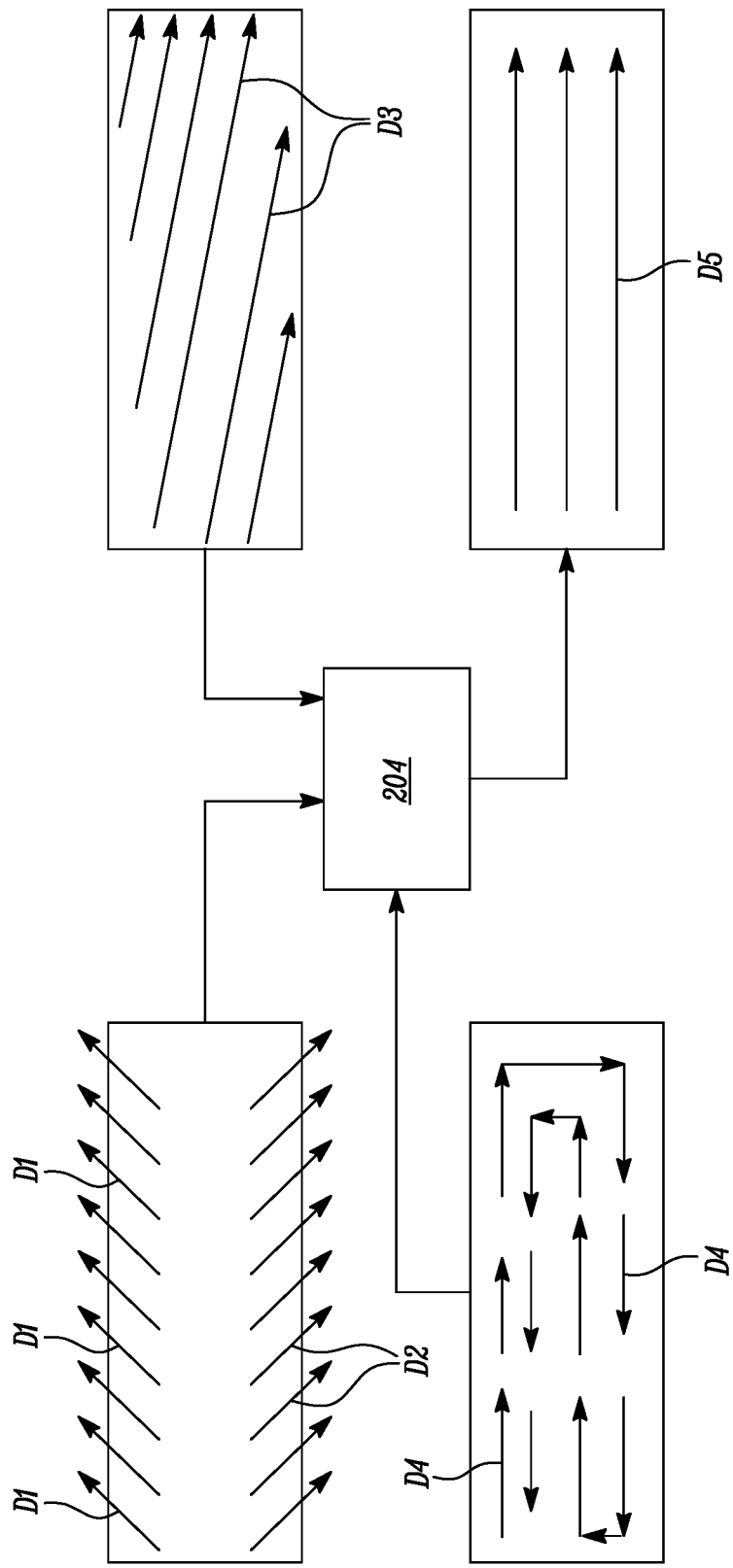
FIG. 5 is a schematic view illustrating various exemplary movement patterns associated with the earthmoving machine and an exemplary optimal direction of movement for the compactor.

In an example, the central controller 204 may determine the optimal direction of movement on the one or more virtual work areas 306A, 306B, 306C, 306D, 306E, 306F, 306G, 306H from the number of virtual work areas 306A, 306B, 306C, 306D, 306E, 306F, 306G, 306H based on a conclusion of the one or more operations by the earthmoving machine 102. Further, the central controller 204 determines the optimal direction of movement for the compactor 108 based on the data indicative of the movement of the earthmoving machine 102. The compactor 108 moves along the optimal direction of movement during the autonomous operation of the compactor 108. Specifically, during autonomous operation, the compactor 108 moves along the optimal direction of movement determined before-hand in accordance with the aforementioned embodiment of the present disclosure. For example, as illustrated in FIG. 5, the earthmoving machine 102 (see FIG. 2) may follow a movement pattern D1 and D2, due to which the earthmoving machine 102 may push some material towards one edge and some material towards another edge. Alternatively, the earthmoving machine 102 may move diagonally and follow a movement pattern D3, due to which the earthmoving machine 102 may push the material sideways. Further, the earthmoving machine 102 may follow a movement pattern D4, due to which the earthmoving machine 102 may push the material towards an edge from which the earthmoving machine 102 may have entered.

It should be noted that the movement patterns D1, D2, D3, D4 illustrated herein are exemplary in nature, and the earthmoving machine 102 may follow any other movement pattern, without any limitations. The central controller 204 (see FIG. 2) may analyze each of the movement patterns D1, D2, D3, D4 to determine an exemplary optimal direction of movement D5 for the compactor 108 (see FIG. 1). The optimal direction of movement D5 may typically embody a generalized and simplified pattern that may be generated taking into consideration the movement patterns D1, D2, D3, D4 of the earthmoving machine 102.

Referring to FIGS. 2 and 3, in addition to the optimal direction of movement, the central controller 204 may also transmit information that may indicate which of the virtual work areas 306A, 306B, 306C, 306D, 306E, 306F, 306G, 306H have been worked upon by the earthmoving machine 102 (see FIG. 1). Thus, the work plan may include the information pertaining to the virtual work areas 306A, 306B, 306C, 306D, 306E, 306F, 306G, 306H on which the earthmoving machine 102 has already performed the one or more operations. For example, the second controller 208 may receive information that the earthmoving machine 102 has concluded operations at the virtual work areas 306A, 306B, 306C and the earthmoving machine 102 is yet to conclude operations at the virtual work areas 306D, 306E, 306F, 306G, 306H. Based on this information, the compactor 108 may only perform the compaction operation on the virtual work areas 306A, 306B, 306C on which the earthmoving machine 102 has already performed the one or more operations.

Based on receipt of the work plan from the central controller 204, the second controller 208 located on the compactor 108 may control one or more components of the compactor 108 to move the compactor 108 for performing the compaction operation. For example, the second controller 208 may control the drums 110 (see FIG. 1) of the compactor 108 for movement of the compactor 108 and subsequently to perform the compaction operation.

In an example, the compactor 108 may move through the virtual work areas 306A, 306B, 306C, 306D, 306E, 306F, 306G, 306H in an order in which the earthmoving machine 102 may have performed the one or more operations on the virtual work areas 306A, 306B, 306C, 306D, 306E, 306F, 306G, 306H. For example, if the earthmoving machine 102 performs the operations on the virtual work area 306A and directly moves to the virtual work area 306C, the compactor 108 may also perform the compaction operation on the virtual work area 306A and may then directly move to the virtual work area 306C.

Figure 6:
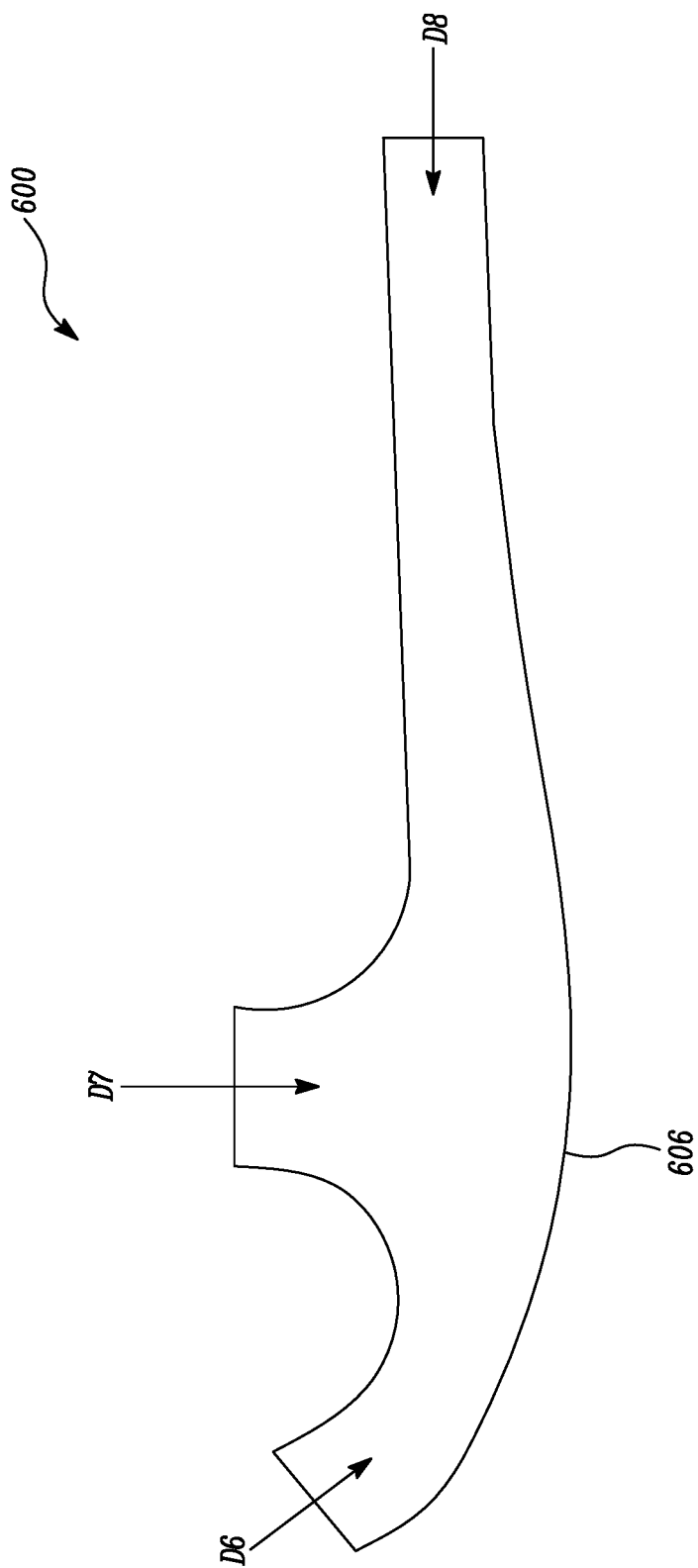
FIG. 6 is a schematic view of an exemplary virtual work area including a continuous edge.

Referring now to FIG. 6, the exemplary virtual work area 600 is illustrated. In an example, the optimal direction of movement for the compactor 108 (see FIG. 1) may be chosen from three possible directions D6, D7, D8 of movement of the earthmoving machine 102 (see FIG. 1) on the virtual work area 600. The central controller 204 may determine the optimal direction of movement for the compactor 108 based on, for example, a longest continuous edge 606 of the virtual work area 600 along which an overall deflection/change in the angle of the longest continuous edge 606 is less than a threshold angle, for example, less than 20 degrees.

Figure 7:
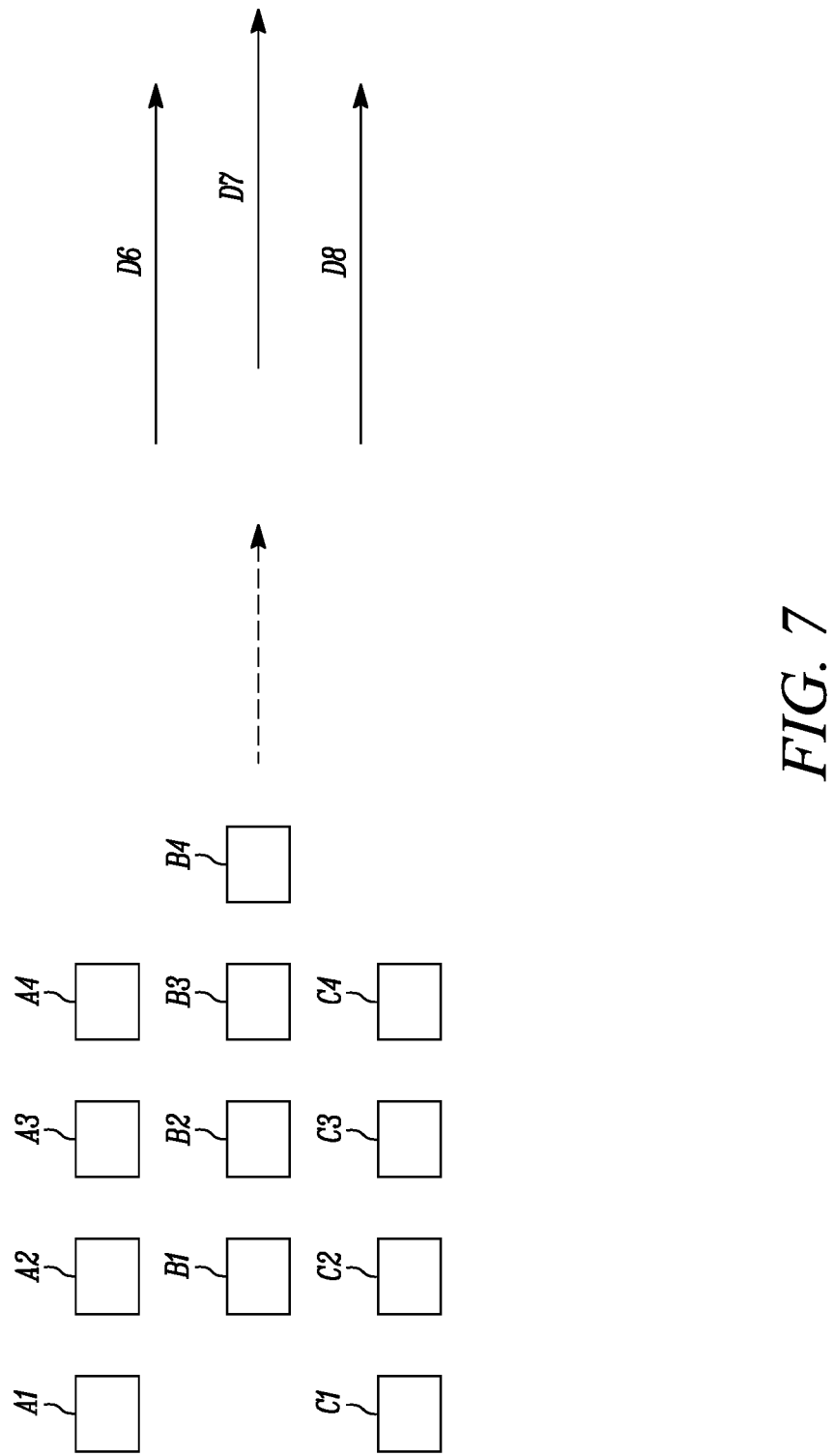
FIG. 7 is a schematic view illustrating exemplary data received from a first controller associated with the earthmoving machine.

The optimal direction of movement for the compactor 108 may be determined based on position data of the earthmoving machine 102 at different instances of time. More particularly, the central controller 204 (see FIG. 2) may receive a number of position inputs associated with the earthmoving machine 102 from the first controller 202 (see FIG. 2). In an example, each position input from the number of position inputs may be indicative of the position of the earthmoving machine 102 on the one or more virtual work areas 600 with respect to time. In an example, the position inputs may be available in terms of 1×1 square feet polygons with timestamps. For example, as illustrated in FIG. 7, polygons A1, A2, A3, A4 may be representative of position inputs along the direction D6 of the earthmoving machine 102 (see FIG. 1). Further, polygons B1, B2, B3, B4 may be representative of position inputs along the direction D7 of the earthmoving machine 102. Moreover, polygons C1, C2, C3, C4 may be representative of position inputs along the direction D8 of the earthmoving machine 102.

Further, the central controller 204 (see FIG. 2) may generate a number of vectors based on an analysis of the number of position inputs. In an example, the polygons A1, A2, A3, A4, B1, B2, B3, B4, C1, C2, C3, C4 may be arranged in an ascending time sequence to form the vectors. Furthermore, the central controller 204 may join the polygons A1, A2, A3, A4, B1, B2, B3, B4, C1, C2, C3, C4 that are close to each other in time for generating the number of vectors. The vectors generated by the central controller 204 thus provide an indication of a magnitude and a direction of the earthmoving machine 102 to the central controller 204. For example, in the context of the present disclosure, the vectors generated by the central controller 204 may provide an indication of the directions D6, D7, D8 of the earthmoving machine 102 on the virtual work area 600.

Moreover, the central controller 204 may determine the optimal direction of movement for the compactor 108 based on an average dot product of the number of vectors. In an example, the central controller 204 may determine the average dot product of the number of vectors associated with the longest continuous edge 606 (see FIG. 6) of the virtual work area 600 as shown in FIG. 6 to find the optimal direction of movement for the compactor 108. Accordingly, in an example, the central controller 204 may determine the optimal direction of movement to be similar to the direction D6 or the direction D8.

Further, if the average dot product of the vectors generated using the data of the polygons A1, A2, A3, A4 is positive, the central controller 204 may determine that the earthmoving machine 102 may be moving along the direction D6. However, if the average dot product of the vectors generated using the data of the polygons A1, A2, A3, A4 is negative, the central controller 204 may determine that the earthmoving machine 102 may be moving along the direction D8. It should be noted that, once the central controller 204 may determine the direction of movement of the earthmoving machine 102, the central controller 204 may determine an entry point through which the compactor 108 may enter the virtual work area 600 and an exit point through which the compactor 108 may exit the virtual work area 600.

In an example, it may be possible that the direction of movement of the earthmoving machine 102 may not align with the longest continuous edge 606 of the virtual work area 600. For example, the earthmoving machine 102 may move along the direction D7. In such examples, the central controller 204 may override the direction D7 of movement of the earthmoving machine 102 and may determine the optimal direction of movement as the direction D6 or the direction D8.

Figure 8:
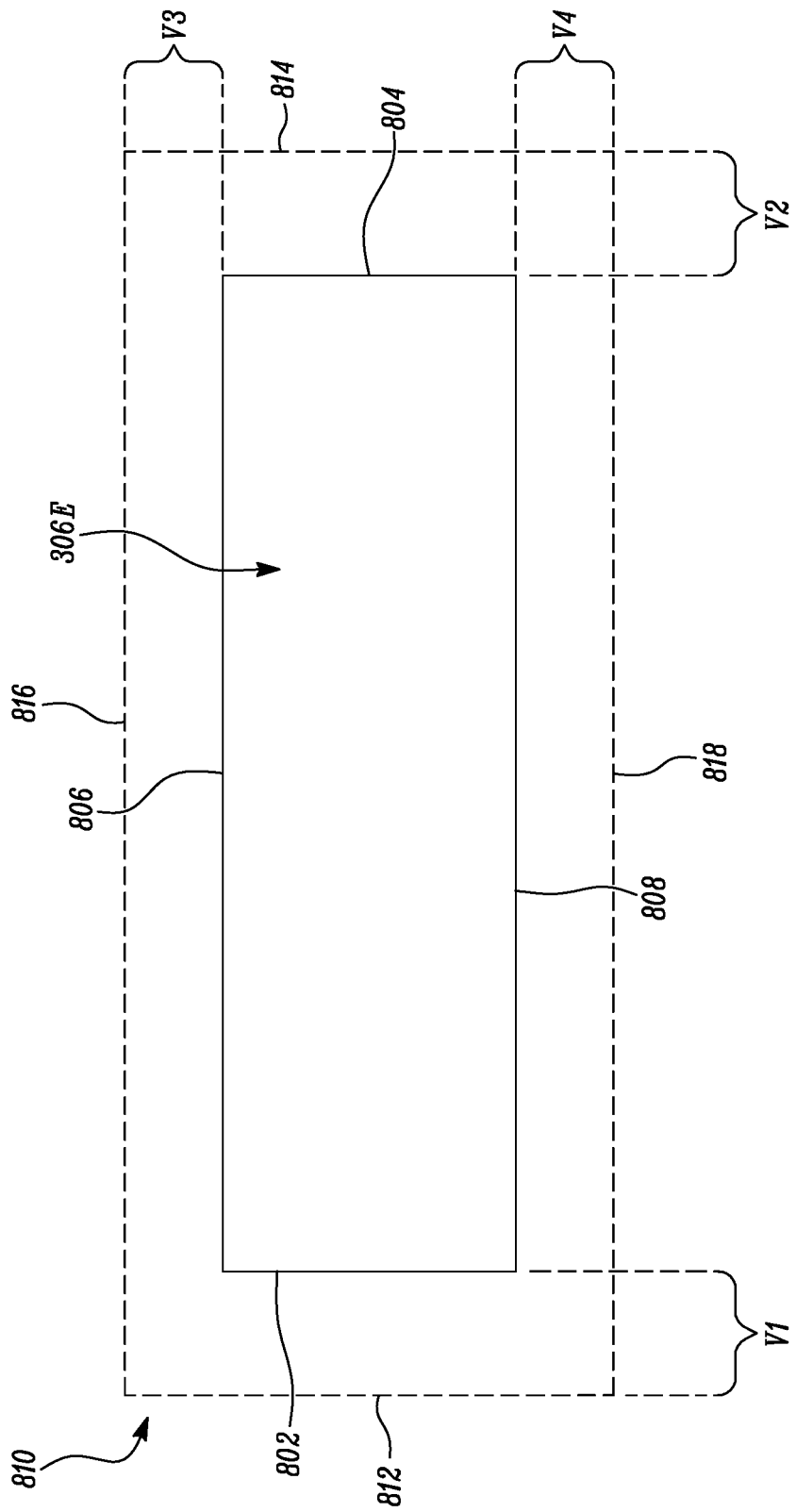
FIG. 8 is a schematic view of an exemplary virtual work area on which the earthmoving machine may operate.

Referring to FIG. 8, the central controller 204 may generate a virtual fence 810 around the one or more virtual work areas 306E from the number of virtual work areas 306A, 306B, 306C, 306D, 306E, 306F, 306G, 306H based on the generation of the optimal direction of movement for the compactor 108. For sake of simplicity, the virtual fence 810 being generated around the virtual work area 306E associated with the work area 300 will now be explained in detail. However, it should be noted that the central controller 204 may use the technique mentioned below for generating a corresponding virtual fence for each virtual work areas 306A, 306B, 306C, 306D, 306F, 306G, 306H (see FIG. 3) associated with the work area 300, the virtual work areas 404A, 404B, 404C (see FIG. 4A) associated with the work area 400 (see FIG. 4A), the virtual work area 410A (see FIG. 4B) associated with the work area 406 (see FIG. 4B), and the virtual work area 600 (see FIG. 6). In another example, the central controller 204 may generate a virtual fence (similar to the virtual fence 810) for the entire work area 300, 400, and 406 (see FIGS. 3, 4A, and 4B, respectively). In this example, the central controller 204 may transmit the information pertaining to the optimal direction of movement when the earthmoving machine 102 is outside the virtual fence of the corresponding work area 300, 400, and 406.

Further, an area of the virtual fence 810 may be greater than an area of the one or more virtual work areas 306E. In an example, the central controller 204 may generate the virtual fence 810 after generating the optimal direction of movement for the compactor 108. As illustrated, the virtual work area 306E defines an entry point 802 and an exit point 804. The entry and exit points 802, 804 are sections through which the compactor 108 may enter and exit the virtual work area 306E. The virtual work area 306E also defines a first side edge 806 and a second side edge 808. Further, the virtual fence 810 defines a fence entry point 812, such that a forward pathing distance V1 is defined between the fence entry point 812 of the virtual fence 810 and the entry point 802 of the virtual work area 306E. It should be noted that the fence entry point 812 of the virtual fence 810 may be indicative of a location from which the compactor 108 may enter the virtual fence 810. In an example, the forward pathing distance V1 may lie in a range of 10 meters to 20 meters, without any limitation thereto.

Furthermore, the virtual fence 810 defines a fence exit point 814, such that a rearward pathing distance V2 is defined between the fence exit point 814 of the virtual fence 810 and the exit point 804 of the virtual work area 306E. It should be noted that the fence exit point 814 is a location of the virtual fence 810 from which the compactor 108 may exit the virtual fence 810. In an example, the rearward pathing distance V2 may lie in a range of 5 meters to 15 meters, without any limitation thereto.

Moreover, the virtual fence 810 also includes a first fence side edge 816, such that a first lean out distance V3 is defined between the first fence side edge 816 of the virtual fence 810 and the first side edge 806 of the virtual work area 306E. Additionally, the virtual fence 810 includes a second fence side edge 818, such that a second lean out distance V4 is defined between the second fence side edge 818 of the virtual fence 810 and the second side edge 808 of the virtual work area 306E. It should be noted that the term "first lean out distance" and the term "second lean out distance" as used herein may be regarded as an additional distance by which the compactor 108 can move beyond the corresponding edges 806, 808 of the virtual work area 306E. In an example, each of the first lean out distance V3 and the second lean out distance V4 may lie in a range of 1 meters to 5 meters, without any limitation thereto. The central controller 204 may determine the optimal direction of movement based on the conclusion of the one or more operations by the earthmoving machine 102. Further, the central controller 204 transmits the information pertaining to the optimal direction of movement to the compactor 108 when the earthmoving machine 102 is outside the virtual fence 810 generated around the one or more virtual work areas 306E. For example, when the earthmoving machine 102 may move outside the virtual fence 810 and enter an adjacent virtual work area, the central controller 204 may transmit the optimal direction of movement to the second controller 208. For a grading operation, the central controller 204 may also determine if an on-grade at the virtual work area 306E is more than a threshold, for example, 80%. If the on-grade is more than the threshold, the central controller 204 may transmit the work plan containing the information pertaining to the optimal direction of movement to the second controller 208.

It should be noted that data pertaining to the virtual fence 810 that is generated by the central controller 204 is transmitted to the second controller 208. If the earthmoving machine 102 concludes the one or more operations on the virtual work area 306E and exits the corresponding virtual fence 810, the compactor 108 enters the virtual fence 810 for performing the compaction operation. It should be noted that the second controller 208 is programmed to prevent a movement of the compactor 108 outside the virtual fence 810 until the compaction operations are concluded on the virtual work area 306E.

It should be noted that, in addition to the optimal direction of movement for the compactor 108, the central controller 204 may also transmit information pertaining to the virtual work areas 306A, 306B, 306C, 306D, 306F, 306G, 306H on which the earthmoving machine 102 may have concluded the one or more operations. In an example, the central controller 204 may also transmit information pertaining to the virtual fence 810, the fence entry point 812 from which the compactor 108 may enter the virtual fence 810, and/or the fence exit point 814 from which the compactor 108 may exit the virtual fence 810.

As illustrated in FIG. 1, the earthmoving machine 102 is operating in the virtual work area 306B and the compactor 108 is operating in the virtual work area 306A. When the earthmoving machine 102 concludes the operations in the virtual work area 306B and moves outside a virtual fence (not shown) of the virtual work area 306B, the central controller 204 may transmit the work plan to the second controller 208. Further, once the compactor 108 concludes the compaction operations on the virtual work area 306A, the compactor 108 may enter the virtual work area 306B for performing the compaction operations.

It should be noted that each of the first controller 202, the second controller 208, and the central controller 204 may embody a single microprocessor or multiple microprocessors for receiving various input signals. Numerous commercially available microprocessors may be configured to perform the functions of respective ones of the first controller 202, the second controller 208, and the central controller 204. Each of the first controller 202, the second controller 208, and the central controller 204 may include a central processing unit, a graphics processing unit, and/or any other system associated hardware and networking circuitry, for instance, signal conditioning and/or processing circuitry.

Figure 9:
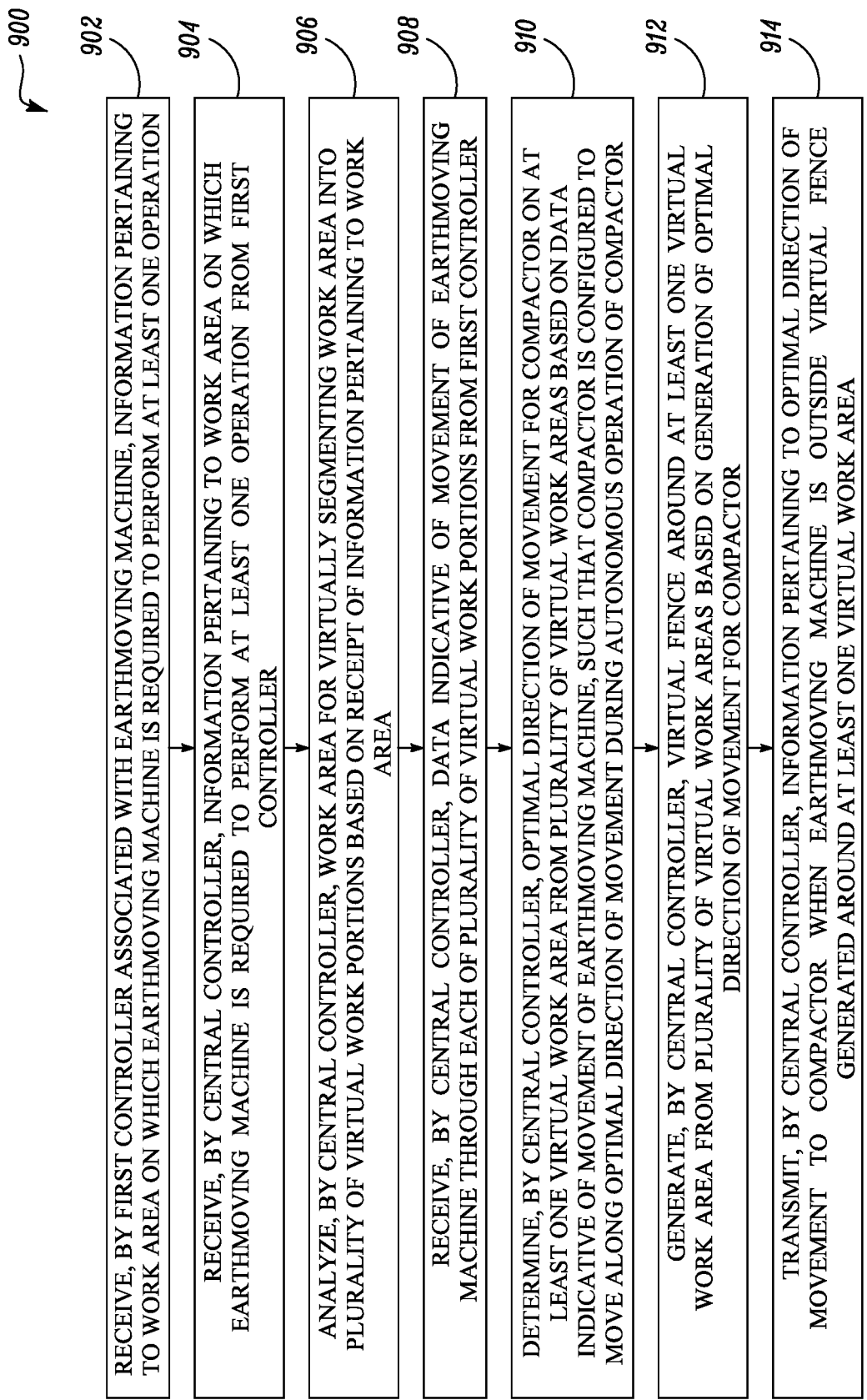
FIG. 9 is a flowchart depicting a method for generating the work plan for the autonomous operation of the compactor in tandem with the earthmoving machine, according to an exemplary embodiment of the present disclosure.

FIG. 9 illustrates a flowchart depicting a method 900 for generating the work plan for the autonomous operation of the compactor 108 in tandem with the earthmoving machine 102. Referring to FIGS. 1, 2, 3, and 9, at step 902, the first controller 202 associated with the earthmoving machine 102 receives the information pertaining to the work area 300 on which the earthmoving machine 102 is required to perform one or more operations. At step 904, the central controller 204 receives the information pertaining to the work area 300 on which the earthmoving machine 102 is required to perform the one or more operations from the first controller 202. The central controller 204 is coupled in communication with the first controller 202.

At step 906, the central controller 204 analyzes the work area 300 for virtually segmenting the work area 300 into the number of virtual work areas 306A, 306B, 306C, 306D, 306E, 306F, 306G, 306H based on the receipt of the information pertaining to the work area 300. The central controller 204 analyzes one or more of the number of convex vertices 314A, 314B, 314C, 314D, 314E, 314F, 314G, 314H, 314I and one or more of the number of number of concave vertices 316A, 316B, 316C, 316D, 316E of the work area 300 for virtually segmenting the work area 300 into the number of virtual work areas 306A, 306B, 306C, 306D, 306E, 306F, 306G, 306H. In an example, the central controller 204 virtually segments the work area 300 into the number of virtual work areas 306A, 306B, 306C, 306D, 306E, 306F, 306G, 306H based on the angle P2 defined by the number of concave vertices 316A, 316B, 316C, 316D, 316E. The number of virtual work areas 306A, 306B, 306C, 306D, 306E, 306F, 306G, 306H includes one or more of the structured virtual work area and the unstructured virtual work area. Further, the central controller 204 determines one or more of the entry point 302 for the compactor 108 and the exit point 304 for the compactor 108 based on the analysis of the number of convex vertices 314A, 314B, 314C, 314D, 314E, 314F, 314G, 314H, 314I.

At step 908, the central controller 204 receives the data indicative of the movement of the earthmoving machine 102 through each of the number of virtual work areas 306A, 306B, 306C, 306D, 306E, 306F, 306G, 306H from the first controller 202. At step 910, the central controller 204 determines the optimal direction of movement for the compactor 108 on the one or more virtual work areas 306A, 306B, 306C, 306D, 306E, 306F, 306G, 306H from the number of virtual work areas 306A, 306B, 306C, 306D, 306E, 306F, 306G, 306H based on the data indicative of the movement of the earthmoving machine 102, such that the compactor 108 moves along the optimal direction of movement during the autonomous operation of the compactor 108.

Referring now to FIGS. 1, 2, 6, and 9, in an example, the central controller 204 receives the number of position inputs associated with the earthmoving machine 102 from the first controller 202. Each position input from the number of position inputs is indicative of the position of the earthmoving machine 102 on the one or more virtual work areas 306A, 306B, 306C, 306D, 306E, 306F, 306G, 306H with respect to time. Further, the central controller 204 generates the number of vectors based on the analysis of the number of position inputs. Furthermore, the central controller 204 determines the optimal direction of movement for the compactor 108 based on the average dot product of the number of vectors.

Moreover, referring to FIGS. 1, 2, 8, and 9, at step 912, the central controller 204 generates the virtual fence 810 around the one or more virtual work areas 306E from the number of virtual work areas 306A, 306B, 306C, 306D, 306E, 306F, 306G, 306H based on the generation of the optimal direction of movement for the compactor 108. The central controller 204 generates the virtual fence 810 such that the area of the virtual fence 810 is greater than the area of the one or more virtual work areas 306E. In an example, the central controller 204 determines the optimal direction of movement based on the conclusion of the one or more operations by the earthmoving machine 102. Further, at step 914, the central controller 104 transmits the information pertaining to the optimal direction of movement to the compactor 108 when the earthmoving machine 102 is outside the virtual fence 810 generated around the one or more virtual work areas 306E. Further, the central controller 204 transmits the information pertaining to the optimal direction of movement to the second controller 208 associated with the compactor 108 when the earthmoving machine 102 is outside the virtual fence 810. The second controller 208 is coupled in communication with the central controller 204. It may be desirable to perform one or more of the steps associated with the method 900 in an order different from that depicted. Furthermore, various steps could be performed together.

Figure 10:
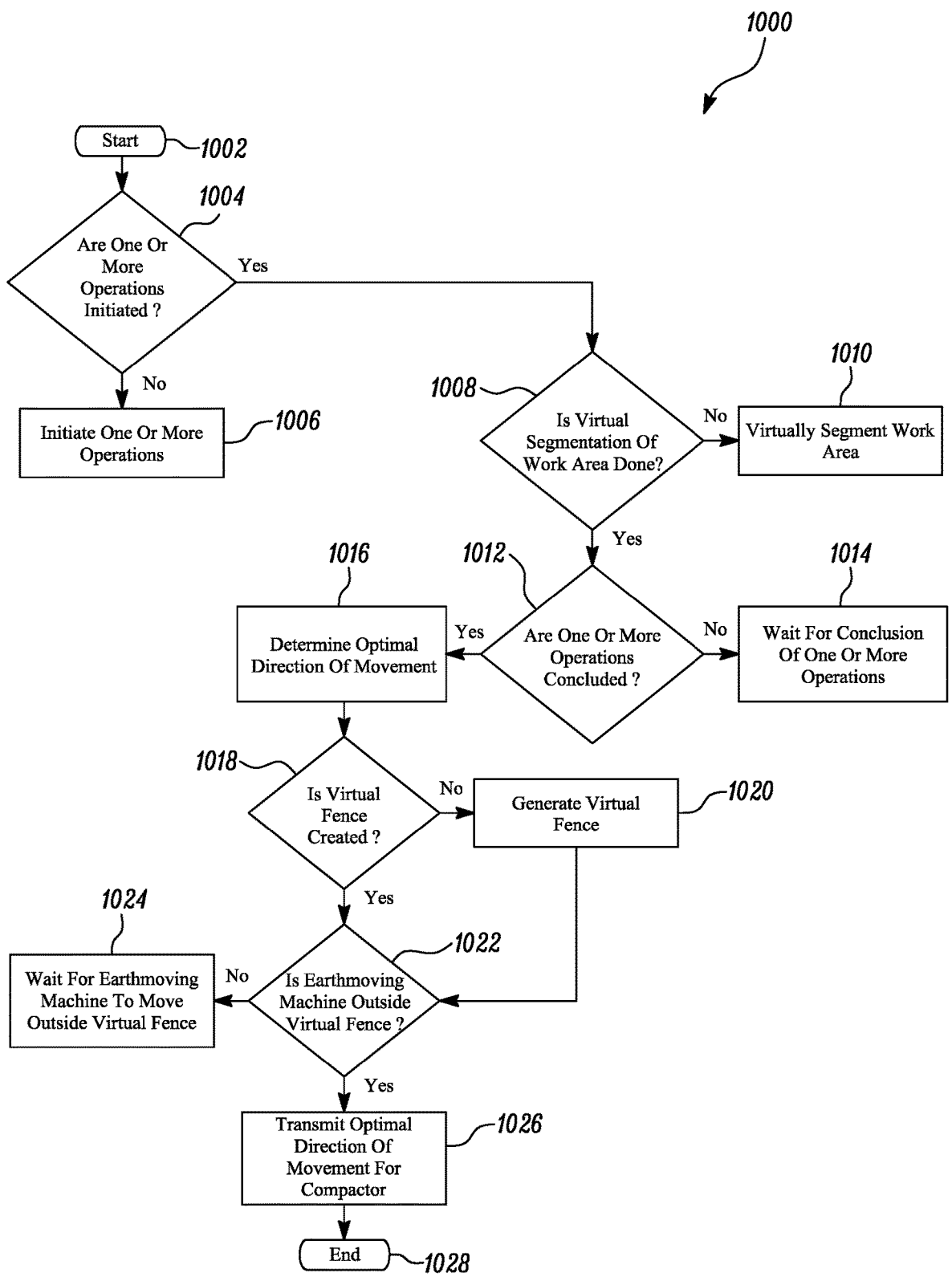
FIG. 10 is a process flowchart for low-level implementation of the method of FIG. 9, according to an exemplary embodiment of the present disclosure.

FIG. 10 is a process flowchart 1000 for low-level implementation of the method 900 of FIG. 9. Referring to FIGS. 1, 2, 3, and 10, the process 1000 may be executed by the central controller 204. The process 1000 may be stored within the memory 206 and may be retrieved for execution by the central controller 204. At a block 1002, the process 1000 starts or begin operation. At a block 1004, the central controller 204 determines if the earthmoving machine 102 has initiated the one or more operations on the work area 300. At the block 1004, if the central controller 204 determines that the earthmoving machine 102 has not initiated the one or more operations on the work area 300, the process 1000 moves to a block 1006. At the block 1006, the central controller 204 may wait until the central controller 204 receives information indicative of the initiation of the one or more operations on the work area 300 from the first controller 202.

However, at the block 1004, if the central controller 204 determines that the earthmoving machine 102 has initiated the one or more operations on the work area 300, the process 1000 moves to a block 1008. At the block 1008, the central controller 204 determines if the work area 300 has been virtually segmented. At the block 1008, if the central controller 204 determines that the work area 300 has not been virtually segmented, the process 1000 moves to a block 1010 to virtual segment the work area 300.

However, at the block 1008, if the central controller 204 determines that the work area 300 has been virtually segmented, the process 1000 moves to a block 1012. At the block 1012, the central controller 204 determines if the earthmoving machine 102 has concluded the one or more operations on the one or more virtual work areas 306A, 306B, 306C, 306D, 306E, 306F, 306G, 306H. At the block 1012, if the central controller 204 determines that the earthmoving machine 102 has not concluded the one or more operations on the one or more virtual work areas 306A, 306B, 306C, 306D, 306E, 306F, 306G, 306H, the process 1000 moves to a block 1014.

At the block 1014, the central controller 204 may wait until the central controller 204 receives information indicative of the conclusion of the one or more operations on the one or more virtual work areas 306A, 306B, 306C, 306D, 306E, 306F, 306G, 306H from the first controller 202. However, at the block 1014, if the earthmoving machine 102 has concluded the one or more operations on the one or more virtual work areas 306A, 306B, 306C, 306D, 306E, 306F, 306G, 306H, the process 1000 moves to a block 1016. At the block 1016, the central controller 204 determines the optimal direction of movement for the compactor 108.

The process 1000 then moves to a block 1018. Referring now to FIGS. 1, 2, 8, and 10, at the block 1018, the central controller 204 determines if the virtual fence 810 has been generated. At the block 1018, if the central controller 204 determines that the virtual fence 810 has not been generated, the process 1000 moves to a block 1020. At the block 1020, the central controller 204 generates the virtual fence 810. However, at the block 1018, if the central controller 204 determines that the virtual fence 810 has been generated, the process 1000 moves to a block 1022. At the block 1022, the central controller 204 determines if the earthmoving machine 102 is outside the virtual fence 810. At the block 1022, if the central controller 204 determines that the earthmoving machine 102 is not outside the process 1000 moves to a block 1024. At the block 1024, the central controller 204 may wait until the earthmoving machine 102 is outside the virtual fence 810.

However, at the block 1022, if the central controller 204 determines that the earthmoving machine 102 is outside the virtual fence 810, the process 1000 moves to a block 1026. At the block 1026, the central controller 204 transmits the optimal direction of movement to the second controller 208 associated with the compactor 108. Further, the process 1000 terminates or ends operation at a block 1028.

INDUSTRIAL APPLICABILITY

The present disclosure relates to the system 200 and the method 900 for generating the work plan for the autonomous operation of the compactor 108 in tandem with the earthmoving machine 102. For explanatory purposes, this section will be explained in relation to operations being performed on the work area 300 by the earthmoving machine 102.

The earthmoving machine 102 may perform the operations at the work areas 300 which may be large in size and may have a complex/irregular shape. However, it may be challenging for the compactor 108 to handle the work areas 300 that are large in size and/or have complex or irregular shapes. According to the present disclosure, the central controller 204 associated with the system 200 transmits the information related to the smaller virtual work areas 306A, 306B, 306C, 306D, 306E, 306F, 306G, 306H that have been previously worked on by the earthmoving machine 102 to the second controller 208.

Further, the system 200 and the method 900 may allow autonomous operation of the compactor 108 once the earthmoving machine 102 has exited the virtual fence (such as, the virtual fence 810) around the corresponding virtual work area 306A, 306B, 306C, 306D, 306E, 306F, 306G, 306H. Specifically, the central controller 204 may generate and transmit the information pertaining to each virtual work area 306A, 306B, 306C, 306D, 306E, 306F, 306G, 306H to the second controller 208 as and when the earthmoving machine 102 exits the corresponding virtual work area 306A, 306B, 306C, 306D, 306E, 306F, 306G, 306H. Thus, the compactor 108 may operate on the virtual work areas 306A, 306B, 306C, 306D, 306E, 306F, 306G, 306H that may have a smaller area and a definite shape. Accordingly, the virtual segmentation of the work area 300 may improve the autonomous operation of the compactor 108. The system 200 and the method 900 described herein may also increase a productivity and an efficiency at the worksite 100.

Further, the central controller 204 generates the optimal direction of movement for the compactor 108 based on the movement of the earthmoving machine 102 in each of the corresponding virtual work areas 306A, 306B, 306C, 306D, 306E, 306F, 306G, 306H. The optimal direction of movement for the compactor 108 being determined by the central controller 204 may be such that the compactor 108 may take least number of turns, or passes, for effectively performing the compaction operation, on the virtual work areas 306A, 306B, 306C, 306D, 306E, 306F, 306G, 306H. Additionally, the optimal direction of movement being determined by the central controller 204 may be such that the compactor 108 performs the compaction operation at each desired location of the virtual work areas 306A, 306B, 306C, 306D, 306E, 306F, 306G, 306H. Further, in an example, the optimal direction of movement may be generated along long and continuous edges of the virtual work areas 306A, 306B, 306C, 306D, 306E, 306F, 306G, 306H which may allow the compactor 108 to move along straight paths without frequent changes to a steering and/or articulation angle of the compactor 108, thereby facilitating an increase in productivity of the compactor 108.

Moreover, the system 200 and the method 900 described herein may perform a vectorized rectangularization of the work area 300. Further, the virtual segmentation of the work area 300 into the smaller virtual work areas 306A, 306B, 306C, 306D, 306E, 306F, 306G, 306H may also ensure that the second controller 208 associated with the compactor 108 receives data corresponding to each location of the work area 300 on which the earthmoving machine 102 may have performed the one or more operations. Thus, the second controller 208 may have exhaustive information of each portion of the work area 300 and therefore, enable autonomous operation of the compactor 108 In such examples, a likelihood of incomplete compaction operations on the work area 300 that were previously worked on by the earthmoving machine 102 may be minimized.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. A system for generating a work plan for autonomous operation of a compactor in tandem with an earthmoving machine, the system comprising:
    a first controller associated with the earthmoving machine, wherein the first controller receives information pertaining to a work area on which the earthmoving machine is required to perform at least one operation; and
    a central controller coupled in communication with the first controller, wherein the central controller is configured to:
        receive, from the first controller, the information pertaining to the work area on which the earthmoving machine is required to perform the at least one operation;
        analyze the work area for virtually segmenting the work area into a plurality of virtual work areas based on a receipt of the information pertaining to the work area;
        receive, from the first controller, data indicative of a movement of the earthmoving machine through each virtual work area from the plurality of virtual work areas;
        determine an optimal direction of movement for the compactor on at least one virtual work area from the plurality of virtual work areas based on the data indicative of the movement of the earthmoving machine, such that the compactor is configured to move along the optimal direction of movement during the autonomous operation of the compactor, the optimal direction being generated by taking into consideration the movement patterns of the earthmoving machine, and by taking into consideration the geometry of the work area including determining an orientation of passes of the earthmoving machine;
        generate a virtual fence around the at least one virtual work area from the plurality of virtual work areas based on generation of the optimal direction of movement for the compactor;
        transmit information pertaining to the optimal direction of movement to the compactor when the earthmoving machine is outside the virtual fence generated around the at least one virtual work area; and
        control the compactor to move in the optimal direction.

2. The system of claim 1, wherein the central controller is configured to:
    receive, from the first controller, a plurality of position inputs associated with the earthmoving machine, wherein each position input from the plurality of position inputs is indicative of the position of the earthmoving machine on the at least one work area with respect to time;
    generate a plurality of vectors based on an analysis of the plurality of position inputs; and
    determine the optimal direction of movement for the compactor based on an average dot product of the plurality of vectors.

3. The system of claim 1, wherein the central controller is configured to analyze at least one of a plurality of convex vertices and at least one of a plurality of concave vertices on the work area for virtually segmenting the work area into the plurality of virtual work areas.

4. The system of claim 3, wherein the central controller is configured to virtually segment the work area into the plurality of virtual work areas based on an angle defined by the plurality of concave vertices, and wherein the plurality of virtual work areas includes at least one of a structured virtual work area and an unstructured virtual work area.

5. The system of claim 3, wherein the central controller is configured to determine at least one of an entry point for the compactor and an exit point for the compactor based on an analysis of the plurality of convex vertices.

6. The system of claim 1, wherein an area of the virtual fence is configured to be greater than an area of the at least one virtual work area.

7. The system of claim 6, wherein the central controller is configured to:
    determine the optimal direction of movement based on a conclusion of the at least one operation by the earthmoving machine; and
    transmit, to a second controller associated with the compactor, the information pertaining to the optimal direction of movement when the earthmoving machine is outside the virtual fence, wherein the second controller is coupled in communication with the central controller.

8. A method for generating a work plan for autonomous operation of a compactor in tandem with an earthmoving machine, the method comprising:
    receiving, by a first controller associated with the earthmoving machine, information pertaining to a work area on which the earthmoving machine is required to perform at least one operation;
    receiving, by a central controller, information pertaining to the work area on which the earthmoving machine is required to perform the at least one operation from the first controller, the central controller is coupled in communication with the first controller;
    analyzing, by the central controller, the work area for virtually segmenting the work area into a plurality of virtual work areas based on a receipt of the information pertaining to the work area;
    receiving, by the central controller, data indicative of a movement of the earthmoving machine through each of the plurality of virtual work areas from the first controller;
    determining, by the central controller, an optimal direction of movement for the compactor on at least one virtual work area from the plurality of virtual work areas based on the data indicative of the movement of the earthmoving machine, such that the compactor is configured to move along the optimal direction of movement during the autonomous operation of the compactor, the optimal direction being generated by taking into consideration the movement patterns of the earthmoving machine, and by taking into consideration the geometry of the work area including determining an orientation of passes of the earthmoving machine;

generate, by the central controller, a virtual fence around the at least one virtual work area from the plurality of virtual work areas based on generation of the optimal direction of movement for the compactor;

transmit, by the central controller, information pertaining to the optimal direction of movement to the compactor when the earthmoving machine is outside the virtual fence generated around the at least one virtual work area; and control, by the central controller, the compactor to move in the optimal direction.

9. The method of claim 8 further comprising:

receiving, from the first controller, a plurality of position inputs associated with the earthmoving machine, wherein each position input from the plurality of position inputs is indicative of the position of the earthmoving machine on the at least one work area with respect to time;

generating, by the central controller, a plurality of vectors based on an analysis of the plurality of position inputs; and determining, by the central controller, the optimal direction of movement for the compactor based on an average dot product of the plurality of vectors.

10. The method of claim 8 further comprising analyzing, by the central controller, at least one of a plurality of convex vertices and at least one of a plurality of concave vertices on the work area for virtually segmenting the work area into the plurality of virtual work areas.

11. The method of claim 10 further comprising virtually segmenting, by the central controller, the work area into the plurality of virtual work areas based on an angle defined by the plurality of concave vertices, wherein the plurality of virtual work areas includes at least one of a structured virtual work area and an unstructured virtual work area.

12. The method of claim 10 further comprising determining, by the central controller, at least one of an entry point for the compactor and an exit point for the compactor based on an analysis of the plurality of convex vertices.

13. The method of claim 8 further comprising generating, by the central controller, the virtual fence such that an area of the virtual fence is configured to be greater than an area of the at least one virtual work area.

14. The method of claim 13 further comprising:

determining, by the central controller, the optimal direction of movement based on a conclusion of the at least one operation by the earthmoving machine; and transmitting, by the central controller, the information pertaining to the optimal direction of movement to a second controller associated with the compactor when the earthmoving machine is outside the virtual fence, wherein the second controller is coupled in communication with the central controller.

15. A non-transitory computer readable medium having computer executable instructions for performing a method for generating a work plan for autonomous operation of a compactor in tandem with an earthmoving machine, the method comprising:

receiving information pertaining to a work area on which the earthmoving machine is required to perform at least one operation;

analyzing the work area for virtually segmenting the work area into a plurality of virtual work areas based on a receipt of the information pertaining to the work area;

receiving data indicative of a movement of the earthmoving machine through each of the plurality of virtual work areas;

determining an optimal direction of movement for the compactor on at least one virtual work area from the plurality of virtual work areas based on the data indicative of the movement of the earthmoving machine, such that the compactor is configured to move along the optimal direction of movement during the autonomous operation of the compactor, the optimal direction being generated by taking into consideration the movement patterns of the earthmoving machine, and by taking into consideration the geometry of the work area including determining an orientation of passes of the earthmoving machine;

generating a virtual fence around the at least one virtual work area from the plurality of virtual work areas based on generation of the optimal direction of movement for the compactor;

transmitting information pertaining to the optimal direction of movement to the compactor when the earthmoving machine is outside the virtual fence generated around the at least one virtual work area; and controlling the compactor to move in the optimal direction.

16. The non-transitory computer readable medium of claim 15 further comprising:

receiving a plurality of position inputs associated with the earthmoving machine, wherein each position input from the plurality of position inputs is indicative of the position of the earthmoving machine on the at least one work area with respect to time;

generating a plurality of vectors based on an analysis of the plurality of position inputs; and determining the optimal direction of movement for the compactor based on an average dot product of the plurality of vectors.

17. The non-transitory computer readable medium of claim 15 further comprising analyzing at least one of a plurality of convex vertices and at least one of a plurality of concave vertices on the work area for virtually segmenting the work area into the plurality of virtual work areas.

18. The non-transitory computer readable medium of claim 17 further comprising virtually segmenting the work area into the plurality of virtual work areas based on an angle defined by the plurality of concave vertices, wherein the plurality of virtual work areas includes at least one of a structured virtual work area and an unstructured virtual work area.

19. The non-transitory computer readable medium of claim 17 further comprising determining at least one of an entry point for the compactor and an exit point for the compactor based on an analysis of the plurality of convex vertices.

20. The non-transitory computer readable medium of claim 15 further comprising generating the virtual fence such that an area of the virtual fence is configured to be greater than an area of the at least one virtual work area.

* * * * *